(12) United States Patent
Rigobert et al.

(10) Patent No.: US 8,021,780 B2
(45) Date of Patent: Sep. 20, 2011

(54) ELECTRICAL CONNECTION DEVICE FOR AN OUTPUT TERMINAL OF A STORAGE BATTERY

(75) Inventors: Gerard Rigobert, Bordeaux (FR); Olivier Masson, Fargues St. Hilaire (FR)

(73) Assignee: SAFT, Bagnolet (FR)

( * ) Notice: Subject to any disclaimer, the term of this patent is extended or adjusted under 35 U.S.C. 154(b) by 1056 days.

(21) Appl. No.: 11/845,156

(22) Filed: Aug. 27, 2007

(65) Prior Publication Data

US 2008/0057394 A1 Mar. 6, 2008

(30) Foreign Application Priority Data

Sep. 5, 2006 (FR) ..................... 06 07753

(51) Int. Cl.
*H01M 2/20* (2006.01)
*H01M 2/22* (2006.01)
*H01M 2/26* (2006.01)
*H01M 2/30* (2006.01)

(52) U.S. Cl. .......... 429/178; 429/161; 429/211

(58) Field of Classification Search .......... None
See application file for complete search history.

(56) References Cited

U.S. PATENT DOCUMENTS

| 4,663,248 A * | 5/1987 | Klein et al. ........... 429/169 |
| 6,579,640 B1 * | 6/2003 | Nagase et al. ........... 429/54 |
| 2005/0008933 A1 * | 1/2005 | Ligeois et al. ........... 429/161 |
| 2006/0024573 A1 | 2/2006 | Yim et al. |

FOREIGN PATENT DOCUMENTS

FR 2 853 764 A1 10/2004

OTHER PUBLICATIONS

Jan. 9, 2008 International Search Reprot EPO.

* cited by examiner

*Primary Examiner* — John S Maples
(74) *Attorney, Agent, or Firm* — Sughrue Mion, PLLC

(57) ABSTRACT

A storage battery (1) includes a container (2) containing an electrochemical stack (9) comprising alternating positive and negative electrodes flanking electrolyte-impregnated separators. A current output terminal (7) passes through a lid (5) of the container. A connector (10), which electrically connects the electrodes of one polarity to the terminal (7) passing through the lid, includes a flat connection (15) welded to the electrodes and an elastic connection (20) which nests into the terminal (7) passing through the lid. Manufacture of a sealed storage battery is simplified by obviating a manual operation of inserting and bending an elongated connection tab inside the container.

7 Claims, 4 Drawing Sheets

ELECTRICAL CONNECTION DEVICE FOR AN OUTPUT TERMINAL OF A STORAGE BATTERY

This invention claims the benefit of priority from French Application No. 0607753, filed Sep. 5, 2006.

BACKGROUND OF THE INVENTION

The present invention relates to a device for providing electrical connection between a current output terminal and an electrochemical stack in a storage battery, and an associated manufacturing method.

An electrochemical cell or storage battery (these two terms being equivalent, the term storage battery will be used hereinafter) is a device for producing electricity in which chemical energy is converted into electrical energy. The chemical energy is constituted by electrochemically active compounds deposited on at least one face of electrodes arranged in the storage battery. The electrical energy is produced by electrochemical reactions during discharge of the storage battery. The electrodes, arranged in a container, are electrically connected to current output terminals to provide electrical continuity between the electrodes and an electrical consumer with which the storage battery is associated. The positive and negative current output terminals can be secured either onto the walls of opposing sides of the container of the storage battery, or onto the wall of a same side of the container.

FIG. 1 shows a sealed cylindrical storage battery of a known type.

Storage battery 1 comprises an electrochemical stack 9 comprising alternating positive and negative electrodes on either side of separators impregnated with electrolyte. Typically, each electrode is made up by a metal current collector also called a foil, carrying on at least one face thereof, the electrochemically active matter. The electrochemical stack 9 is arranged in a sealed container 2 having a cylindrical wall closed off by a base 3 at one end thereof and covered at the other end by a lid 5 which carries the current output terminals 6 and 7. A first current output terminal, in the example the positive terminals 6, is generally welded onto the lid. A second current output terminal, in the example the negative terminal 7, passes through the lid; it is generally secured onto the latter by crimping, with seals 8 electrically insulating the negative current output terminal 7 from the lid 5.

The current output terminals 6, 7 provide electrical continuity between the electrodes and the external application with which the storage battery is associated. There exist several ways of electrically connecting the electrodes of a given polarity to one of the current output terminals on the container. One possible solution consists in employing a flat connection applied onto the collectors of the electrodes having the same polarity. This known solution is illustrated on FIG. 1; a flat connection 11 connects the positive electrodes of electrochemical stack 9 together, and a conducting shaped part 12 connects this flat connection 11 to the bottom wall 3 of the container, the walls of the container being electrically conducting with the lid 5 and the positive terminal 6 welded onto the lid. Similarly, a flat connection 13 connects the negative electrodes of electrochemical stack 9 together, and an elongated tab 14 connects this flat connection 13 to the negative current output terminal 7. The elongated tab 14 forms at least one bend in order to impart an elastic effect to the electrical connection between the negative electrodes and the negative current output terminal, and which compensates for variation in height of electrochemical stacks from one storage battery to another.

Typically, the device for providing electrical connection to the terminal passing through the container wall—in the example of FIG. 1 this is the negative terminal—is assembled in the following way. Flat connection 13 is welded onto the collectors of the electrodes of a given polarity after which the elongated tab 14 is welded onto the flat connection 13 and onto the lower portion of through terminal 7. The elongated tab 14 is then bent inside the storage battery while the container 2 is being closed by the lid 5. The operation of bending and positioning the elongated tab inside the storage battery is generally done manually and is complicated.

EP-A-0,029,925 discloses an electrical connection device comprising a full disc which is arranged and welded onto the edge portions of the roll of spirally-wound electrodes. This full disc is provided with an elongated tab which is welded to a sealing disk in contact with one of the current output terminals.

U.S. Pat. No. 4,009,053 discloses an electrical connection device comprising a flat circular connection incorporating radial slots in the form of slashes, the bent over edges of which act to provide electrical contact with the collectors of the spirally-wound electrodes.

EP-A-1,102,337 discloses a storage battery comprising a spirally-wound electrochemical stack. Each electrode has a metal foil acting as the current collector. The foils of a given polarity respectively project externally of the electrochemical stack and are bent over to form a flat base onto which an elongated flat connection tab is welded.

French patent application 2,748,006 discloses a method of connection by bundling. Edge portions of the electrodes are brought together into two half-bundles connected horizontally to a current output terminal.

EP-A-1,596,449 discloses a connection device comprising a flat connection welded onto a substantially flat base plate formed by the folded foils of the electrodes of a given polarity. An elongated folded tongue is then welded between the flat connection and the bottom portion of the current output terminal passing through the container wall.

U.S. Pat. No. 3,761,314 discloses a connection device comprising a flat connection welded onto the folded foils of the electrodes of a given polarity. The flat connection is in direct contact with the current output terminal, elasticity of the connection being insured by the folding of the foils of the electrodes.

EP-A-0,955,682 discloses a connection device comprising electrical connection strips welded onto the folded ends of the foils of the electrodes of a given polarity.

There exists a need for a simplified electrical connection device; in particular, for a device providing connection between the same-polarity electrodes and a current output terminal passing through a wall of the container which dispenses with the elongated connection tab, and which requires no welding to the current output terminal.

SUMMARY OF THE INVENTION

To this end, the invention provides for the use of a connector comprising a flat connection for connection to the collectors of electrodes of a same polarity and an elastic connection element adapted to provide electrical contact with the through terminal, without the use of welding.

More particularly, the invention provides a sealed storage battery comprising: a container containing an electrochemical stack comprising alternating positive and negative electrodes on either side of separators impregnated with electrolyte; a current output terminal passing through a wall of the container; a connector electrically connecting the electrodes of one polarity to the terminal passing through a wall of the container, said connector comprising a flat connection welded to said electrodes and an elastic connection fitted to said terminal passing through a wall of the container.

In one embodiment, the elastic connection comprises a stud surrounded by a flexible ring and penetrating into a recess of the terminal passing through a wall of the container.

The flexible ring may be a one-piece construction with the stud.

In another embodiment, the elastic connection comprises a crown containing a flexible ring encircling the terminal passing through a wall of the container.

The flexible ring may be a one-piece construction with the crown.

In another embodiment, the elastic connection comprises a corrugated plate penetrating into a recess of the terminal passing through a wall of the container. The corrugated plate may be constituted by a shaped portion of the flat connection.

In an embodiment, each electrode comprises a metal current collector, the collectors being folded in a direction substantially perpendicular to their initial direction over a height at least equal to the distance separating them from adjoining collectors of the same polarity so as to form a substantially planar and continuous baseplate on which the flat connection of the connector is welded.

In another embodiment, the output terminal passing through a wall of the container is the negative terminal and the connector is of a material selected from the group consisting of a Cu/Ni composite, copper, nickel or stainless steel.

In yet a further embodiment, the output terminal passing through a wall of the container has an axis of symmetry, the connector being symmetrical with respect to this axis.

The invention also provides a method for producing a sealed storage battery comprising the steps consisting of: producing an electrochemical stack comprising alternating positive and negative electrodes on either side of separators impregnated with electrolyte; receiving a connector comprising a flat connection and an elastic connection to be fitted to a current output terminal; welding the electrodes of one polarity to the flat connection of the connector and the electrodes of the other polarity to a second connection; introducing the electrochemical stack provided with its connections into a container; closing the container by a lid provided with at least one current output terminal passing through a wall of the lid; and filling the container with the electrolyte, the elastic connection of the connector being fitted to the terminal passing through a wall of the lid when the container is closed with the lid.

DETAILED DESCRIPTION OF PREFERRED EMBODIMENTS

Figure 1:
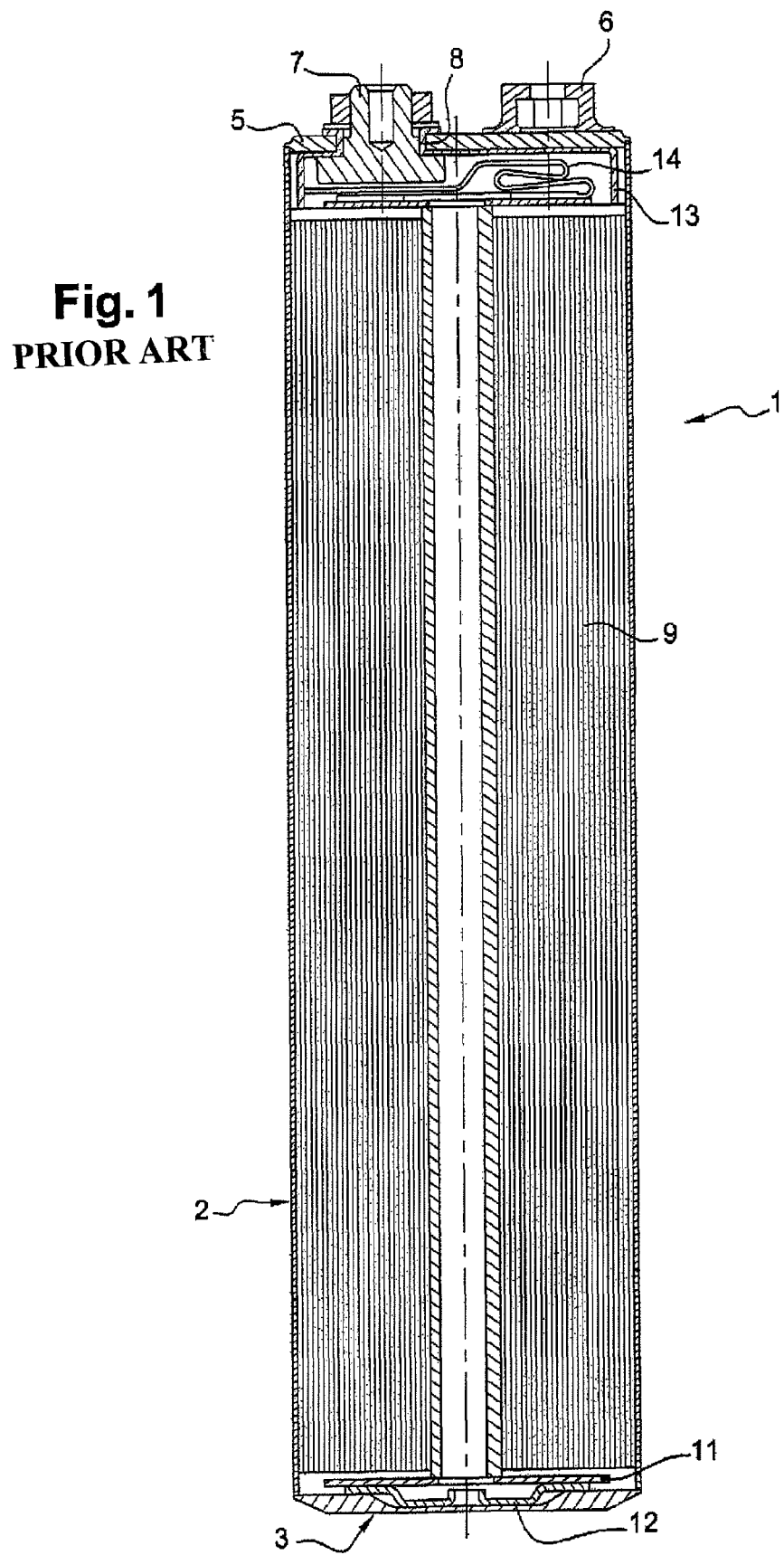
FIG. 1, already described, is a longitudinal cross-section of a sealed cylindrical storage battery of the prior art.

Similar to the prior art design, the invention provides a sealed storage battery 1 comprising a container 2 containing an electrochemical stack 9 and output terminals with one terminal having the same polarity as the wall of the container, and one terminal 7 passing through a wall of the container.

According to the invention, the storage battery comprises a connector 10 electrically connecting the electrodes of one polarity of the electrochemical stack to the output terminal 7 which passes through a wall of the container. This connector 10 comprises a flat connection 15 welded to the electrodes and an elastic connection 20 fitted to or nested into the terminal 7.

This electrical connection device considerably facilitates manufacture of the storage battery of the invention. Welding is only involved between the connection device and the current collectors for the electrodes of a same polarity after which the connection device is simply fitted to the terminal that passes through a wall of the container. In particular, the elongated tab 14 of the prior art providing electrical continuity between flat connection 13 and the bottom of terminal 7 can be dispensed with. The manual operation of inserting and then bending an elongated connection tab of the prior art container is consequently dispensed with.

The invention will be described below with reference to three possible embodiments given by way of example. Those components that are identical to those described with reference to FIG. 1 bear the same reference numerals.

Figure 2A:
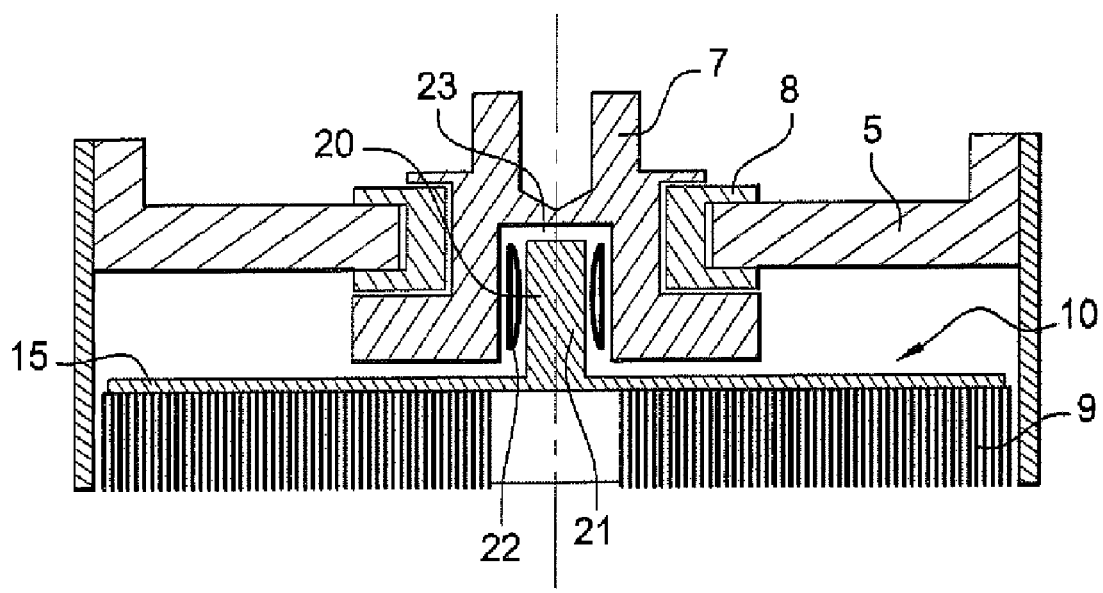
FIG. 2A shows a cross section of the electrical connection device according to a first embodiment of the invention.
Figure 2B:
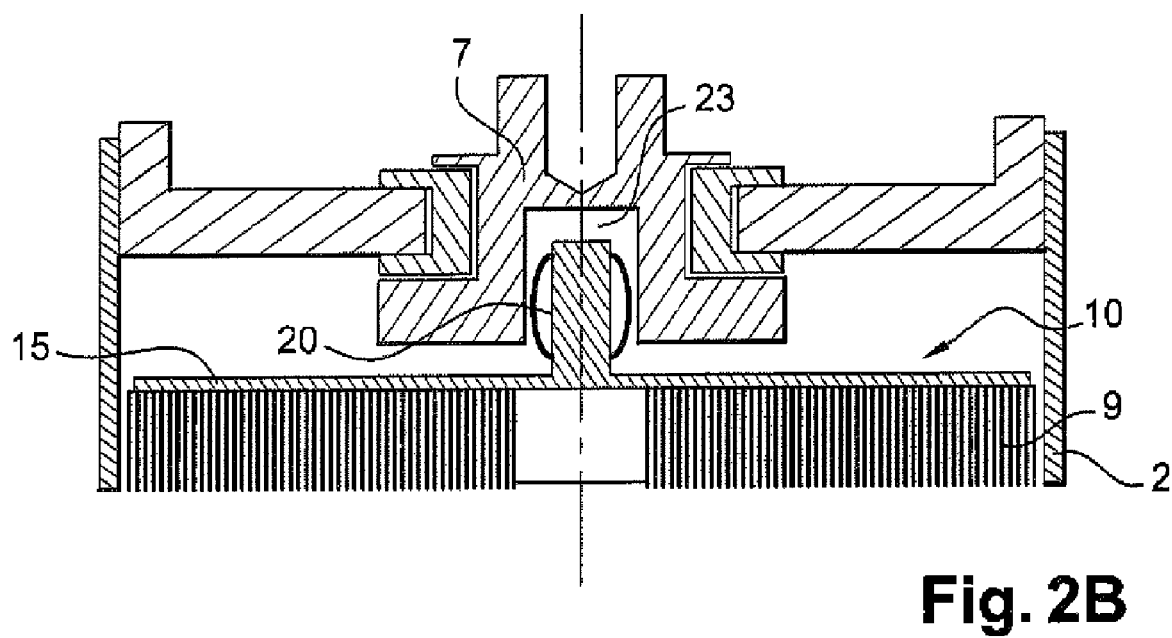
FIG. 2B shows an alternative embodiment of the electrical connection device shown in FIG. 2A.

FIGS. 2A and 2B illustrate a first embodiment of the invention. The storage battery comprises an electrochemical stack 9 comprising alternating positive and negative electrodes on either side of separators impregnated with electrolyte. These figures only show the top of the storage battery with the lid 5 and the terminal 7 that passes through the container (hereinafter, the through terminal). The other output terminal can be located in the bottom region of the container or be constituted by the walls of the container. In the figures, through output terminal 7 is secured by means of lid 5 by crimping, seals 8 keeping the container sealed and electrically insulating output terminal 7 from lid 5. The figures show the ends of the current collectors of the electrodes of a given polarity which extend outside of the electrochemical stack, in other words the end of the foils that is not covered with active material, which project for connection to through output terminal 7.

FIGS. 2A and 2B show the connector 10 electrically connecting the current collectors to the through output terminal 7. This connector 10 comprises a flat connection 15 which is welded to the ends of the collectors and an elastic connection 20 which fits to output terminal 7. Flat connection 15 can be a metal disc or a metal strip which makes contact with all of the current collectors of electrodes of a given polarity. Current produced by electrochemical reactions between each electrode is thus collected on flat connection 15. The elastic connection 20 can be a stud 21 surrounded by a flexible ring 22. This elastic connection 20 is nested or fitted into output terminal 7; nesting is ensured as a result of stud 21 and flexible ring 22 penetrating into a recess 23 provided in terminal 7.

The height of stud 21 is sufficient to guarantee the stud is correctly maintained inside the recess and ensures electrical contact with the output terminal 7 despite tolerable height differences from one electrochemical stack of a storage battery to another. Stud 21 can be around 6 mm high for electrochemical stacks of around 11 cm high and about 12 mm for electrochemical stacks that are around 20 cm high.

Flexible ring 22 absorbs the clearance between the outer diameter of stud 21 and the inside diameter of recess 23 in terminal 7, to insure good electrical contact between the stud and the terminal intermitted therewith. This clearance is necessary to insure that the stud readily fits to the terminal and to take up variations in relative positioning between the stud and the terminal.

Flexible ring 22 can be of a one-piece construction with the stud, as can be seen in FIG. 2B. Additionally, stud 21 can be of a one-piece construction with flat connection 15. For example, flat connection 15, stud 21 and flexible ring 22 can be produced in the form of one single metal part. If through terminal 7 is the negative terminal, the connector 10, consisting of the stud, the flexible ring and the flat connection, can be produced in Cu/Ni composite, copper, nickel or stainless steel.

Figure 3A:
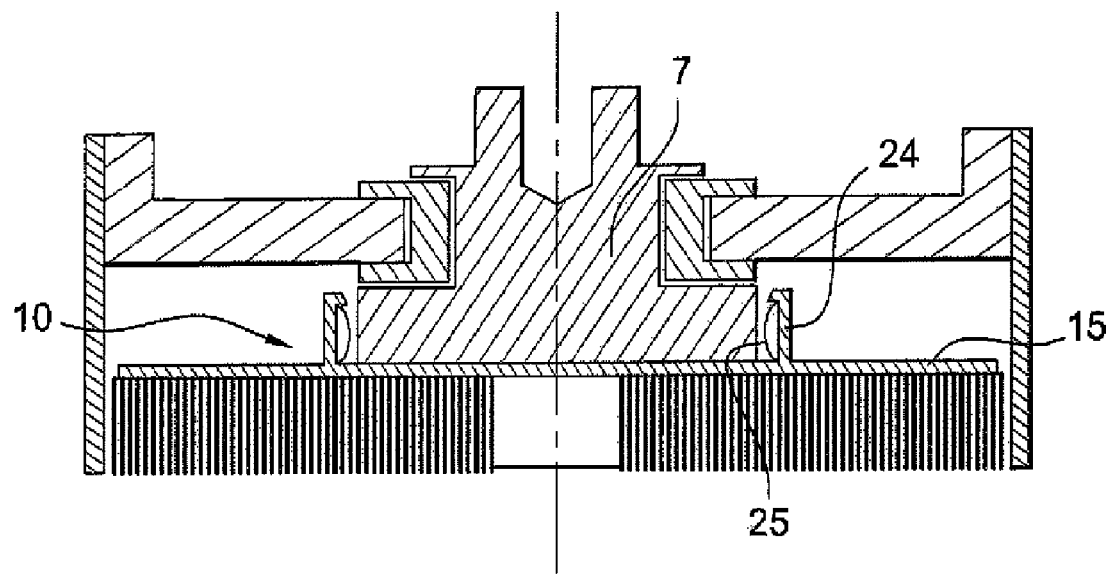
FIG. 3A is a cross section of the electrical connection device according to a second embodiment of the invention.
Figure 3B:
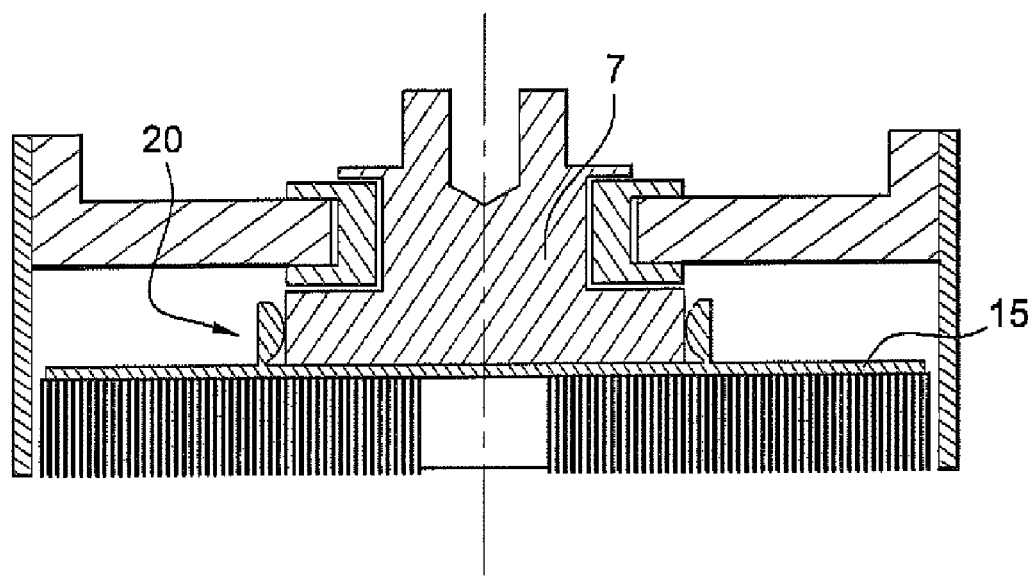
FIG. 3B is an alternative embodiment of the electrical connection device shown in FIG. 3A.

FIGS. 3A and 3B illustrate a second embodiment of the invention. In this embodiment, connector 10 electrically connecting the current collectors to through output terminal 7 comprises a flat connection 15 which is welded to the ends of the current collectors and an elastic connection 20 which fits to through terminal 7.

Elastic connection 20 can be a crown 24 containing a flexible ring 25. This elastic connection 20 fits to output terminal 7; intermitting is provided by crown 24 and flexible ring 25 encircling the periphery of terminal 7.

Crown 24, like the stud 21 of FIGS. 2A and 2B, has sufficient height to ensure electrical contact with output terminal 7 despite tolerable variations in height from one electrochemical stack of a storage battery to another. Crown 24 can be around 6 mm high for electrochemical stacks of around 11 centimetres high and of the order of 12 mm for electrochemical stacks of some 20 cm high.

Flexible ring 25 takes up clearance between the inside diameter of crown 24 and the outside diameter of terminal 7, to insure good electrical contact between the interfitting crown and terminal. This clearance is necessary to allow the terminal to be readily fitted into crown of 24, and to take up variations in relative positioning between crown 24 and the terminal.

As explained previously, flexible ring 25 can be of a one-piece construction with crown 24, as illustrated in FIG. 3B. Further, crown 24 can be of a one-piece construction with flat connection 15. For example, flat connection 15, crown 24 and flexible ring 25 can be produced as one single metal part, for example in Cu/Ni composite material, copper, nickel or stainless steel.

Figure 4A:
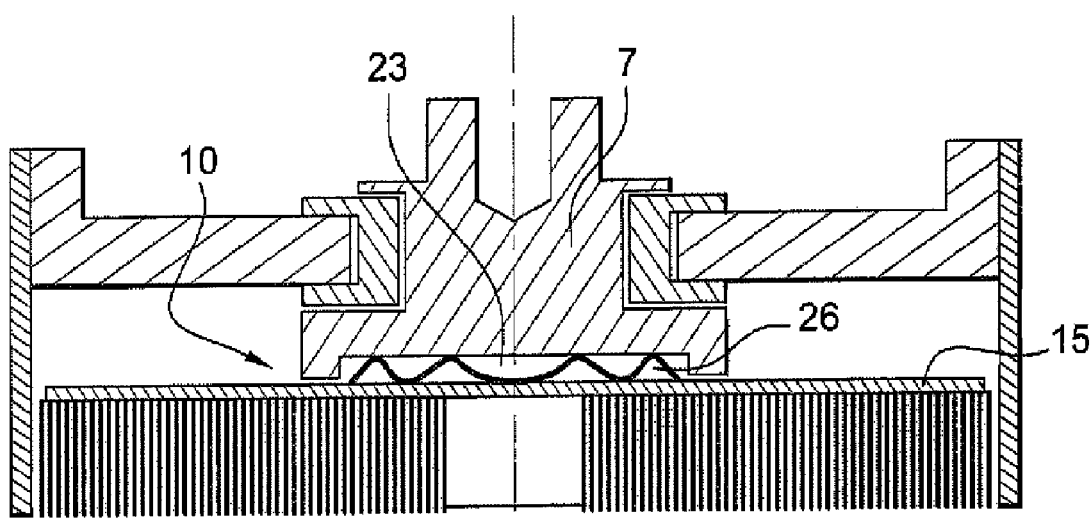
FIG. 4A is a cross section of the electrical connection device according to a third embodiment of the invention.
Figure 4B:
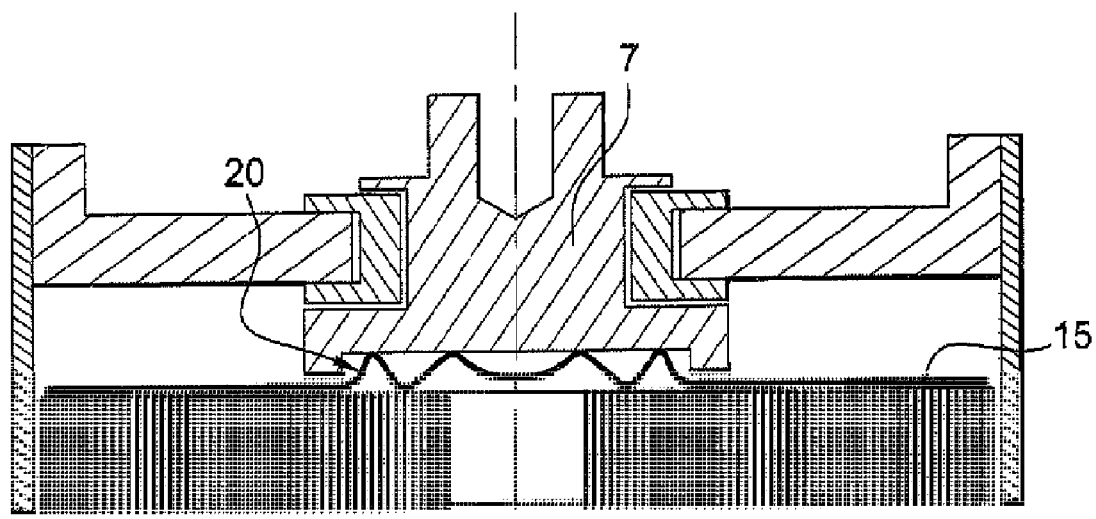
FIG. 4B shows an alternative embodiment of the electrical connection device in FIG. 4A.

FIGS. 4A and 4B show a third embodiment of the invention. In this embodiment, connector 10 electrically connecting the current collectors to through output terminal 7 comprises a flat connection 15 which is welded to the ends of the current collectors, and an elastic connection 20 which fits to terminal 7.

Elastic connection 20 can be a corrugated plate 26 which is fitted into a recess 23 in output terminal 7; nesting thereinto is ensured as a result of the corrugated plate 26 being covered over by recess 23 in terminal 7.

The height of the corrugations in corrugated plate 26 is such that the projecting regions thereof are sufficiently high to insure electrical contact with output terminal 7, despite tolerable variations in height from one electrochemical stack of the storage battery to another. The peak to-valley dimension of corrugated plate 26 can be about 3 mm for electrochemical stacks around 11 cm high and about 6 mm for electrochemical stacks around 20 cm high.

The area occupied by the corrugated plate 26 is smaller than the area of recess 23 in terminal 7, to insure that the corrugations will indeed penetrate inside the recess in the terminal to insure good electrical contact between it and the terminal it nests into.

Corrugated plate 26 can also be of a one-piece construction with flat connection 15, as shown on FIG. 4B. For example, flat connection 15 can have a portion that is shaped to provide the corrugations 26 thereby constituting the elastic connection 20 of connector 10.

Further, through output terminal 7 can have an axis of symmetry. The goal then will be to form a connector 10 which is symmetrical with respect to this axis in order to simplify fitting of elastic connection 20 with output terminal 7 and nesting thereinto.

We shall now describe one possible method for producing a storage battery according to the invention. This description considers the case of a cylindrical storage battery.

An electrochemical stack is produced. The positive electrode consists of a current collector which can be an aluminium foil, covered with active material constituted by a transition metal lithium oxide such as $LiCoO_2$, $LiNiO_2$, $LiMnO_2$, $LiMn_2O_4$, or a mixture thereof. The negative electrode consists of a current collector which can be a copper foil covered with active material constituted by a material capable of reversibly inserting lithium, such as graphite, pitch coke, vitreous carbon and carbon black. The separator can be of polyolefin. A stack of at least one positive electrode, at least one separator and at least one negative electrode is made to form electrochemical stack 9. The electrochemical stack is wound around a hollow core which can be of aluminum, polypropylene, polyethylene or Ultem®.

A connector 10, comprising a flat connection 15 and an elastic connection designed to be fitted to a current output terminal is provided. This connector 10 can have been produced by tooling or moulding a metal composite compatible with the electrodes of the polarity intended to be connected to the current output terminal that passes through a wall of the container.

Next, the electrodes of one polarity—for example the negative polarity—are welded to the flat connection 15 of connector 10 and the electrodes of the other polarity—for example the positive polarity—are welded to a connection designed to make contact with the bottom of the container.

In one embodiment, the metal foils of the electrodes can be folded over in a direction substantially perpendicular to their initial direction over a height at least equal to the distance that separates them from adjoining current collectors of the same polarity in order to constitute a substantially planar and continuous baseplate onto which flat connection 15 of connector 10 is welded.

Next, the electrochemical stack 9 provided with its connections is introduced into the container 2. The container is closed in a sealed manner by welding a lid 5 provided with at least one current output terminal 7 passing through the wall of this lid, onto the open end of container 2.

When the container, with its lid provided with a through output terminal 7 is closed, the elastic connection 20 of connector 10 will nest into the through terminal 7. The operation of positioning and bending an elongated tab to be welded to the bottom of the through terminal 7 is consequently obviated. Manufacture of the storage battery is simplified. Impregnation of the electrodes and separators as well as filling the container with electrolyte is performed under negative air pressure in the container.

The embodiments discussed above and the drawings should be considered as having been provided by way of non-limiting example, and the invention is not intended to be limited to the details provided here but can be modified while still remaining within the scope of the attached claims. In particular, the invention concerns any type of storage battery whether it be prismatic, cylindrical or concentric; or whether it be of the lithium-ion, nickel cadmium or nickel metal hydride type

The invention claimed is:

1. A sealed storage battery comprising:
    a container containing an electrochemical stack comprising alternating positive and negative electrodes on either side of separators impregnated with electrolyte;
    a current output terminal passing through a wall of the container;
    a connector electrically connecting the electrodes of one polarity to the terminal passing through a wall of the container,
    said connector comprising a flat connection welded to said electrodes and an elastic connection fitted without welding to said terminal passing through a wall of the container,
    wherein the elastic connection comprises a stud surrounded by a flexible ring and penetrating into a recess of the terminal passing through a wall of the container.

2. The storage battery according to claim 1, in which the flexible ring is of a one-piece construction with the stud.

3. The storage battery according to claim 1, in which each electrode comprises a metal current collector, the collectors being folded in a direction substantially perpendicular to their initial direction over a height at least equal to the distance separating them from adjoining collectors of the same polarity so as to form a substantially planar and continuous baseplate on which the flat connection of the connector is welded.

4. The storage battery according to claim 1, in which the output terminal passing through a wall of the container is the negative terminal and the connector is of a material selected from the group consisting of a Cu/Ni composite, copper, nickel and stainless steel.

5. The storage battery according to claim 1, in which the output terminal passing through a wall of the container has an axis of symmetry, the connector being symmetrical with respect to this axis.

6. A sealed storage battery comprising:
    a container containing an electrochemical stack comprising alternating positive and negative electrodes on either side of separators impregnated with electrolyte;
    a current output terminal passing through a wall of the container;
    a connector electrically connecting the electrodes of one polarity to the terminal passing through a wall of the container,
    said connector comprising a flat connection welded to said electrodes and an elastic connection fitted to said terminal passing through a wall of the container,
    wherein the elastic connection comprises a stud surrounded by a flexible ring and penetrating into a recess of the terminal passing through a wall of the container.

7. The storage battery according to claim 6, wherein the flexible ring is of a one-piece construction with the stud.

* * * * *